United States Patent
Racault et al.

(10) Patent No.: US 9,328,831 B2
(45) Date of Patent: May 3, 2016

(54) PRESSURE RELIEF VALVE

(71) Applicant: Stanley Works (Europe) GmbH, Duebendorf (CH)

(72) Inventors: André Racault, Saint Sulpice de Pommeray (FR); Patrick Vervier, Saint Claude de Diray (FR)

(73) Assignee: Dubuis et Cie S.A.S., Villebarou (FR)

( * ) Notice: Subject to any disclaimer, the term of this patent is extended or adjusted under 35 U.S.C. 154(b) by 374 days.

(21) Appl. No.: 13/766,404

(22) Filed: Feb. 13, 2013

(65) Prior Publication Data

US 2013/0240061 A1    Sep. 19, 2013

(30) Foreign Application Priority Data

Feb. 13, 2012  (FR) ..................................... 12 51333

(51) Int. Cl.
| | |
|---|---|
| *F16K 17/08* | (2006.01) |
| *F16K 17/06* | (2006.01) |
| *F16K 15/02* | (2006.01) |
| *F16K 17/04* | (2006.01) |
| *B30B 1/32* | (2006.01) |
| *B30B 15/00* | (2006.01) |
| *H01R 43/042* | (2006.01) |

(52) U.S. Cl.
CPC .................. *F16K 15/026* (2013.01); *B30B 1/32* (2013.01); *B30B 15/0052* (2013.01); *F16K 17/04* (2013.01); *F16K 17/06* (2013.01); *F16K 17/08* (2013.01); *H01R 43/0427* (2013.01); *Y10T 137/7904* (2015.04); *Y10T 137/7905* (2015.04); *Y10T 137/86485* (2015.04)

(58) Field of Classification Search
CPC ......... F16K 17/08; F16K 17/06; F16K 17/04; F16K 15/026; B30B 1/32; B30B 15/0052; B30B 15/16; H01R 43/0427; B21J 9/18; B21J 15/20; B21J 15/26; B25B 27/10; B21D 39/048; B21D 22/02; B21D 28/00; B21D 41/02; B21D 39/04; B25F 5/005

USPC .............. 72/453.18, 453.01, 453.03, 453.16, 72/416; 100/50, 269.01, 269.15, 269.16, 100/269.18, 269.19; 137/512.2

See application file for complete search history.

(56) References Cited

U.S. PATENT DOCUMENTS

| | | | |
|---|---|---|---|
| 2,995,148 A | 8/1961 | Novak et al. | |
| 6,273,286 B1 | 8/2001 | Segrest, III | |
| 2005/0045229 A1* | 3/2005 | Slawinski | ............. F16K 17/105 137/491 |
| 2007/0056632 A1* | 3/2007 | Cheong | ................. F16K 17/105 137/491 |
| 2007/0214861 A1* | 9/2007 | Lefavour | .............. B23D 29/002 72/453.16 |
| 2010/0263755 A1 | 10/2010 | Taylor et al. | |
| 2013/0032225 A1* | 2/2013 | Kim | ...................... F15B 13/024 137/489.5 |

FOREIGN PATENT DOCUMENTS

| | | | | |
|---|---|---|---|---|
| EP | 0504573 A | 9/1992 | | |
| WO | 2009150495 A | 12/2009 | | |
| ZA | WO 2009150495 A1 * | 12/2009 | .............. | F16K 1/385 |

\* cited by examiner

*Primary Examiner* — Shelley Self
*Assistant Examiner* — Gregory Swiatocha
(74) *Attorney, Agent, or Firm* — Michael P. Leary

(57) ABSTRACT

A pressure relief valve for a hydraulic press tool, the pressure relief valve having a valve body, a fluid return channel, a needle and a seat, and the needle is movable between a closed position, in which the needle is in contact with the seat to block the channel, and an open position, wherein the needle is at a distance from the seat to allow fluid to flow in the channel, and the fluid flow then causes movement of the seat away from the needle and completes the opening of the fluid return channel.

20 Claims, 12 Drawing Sheets

PRESSURE RELIEF VALVE

CROSS-REFERENCE TO RELATED APPLICATIONS

This application claims priority from French Patent Application No. FR 1,251,333, filed on Feb. 13, 2012, the disclosure of which is incorporated herein by reference.

FIELD OF THE INVENTION

The invention relates to a pressure relief valve for a hydraulic press tool, and a hydraulic press tool incorporating such a valve.

There are known portable hydraulic press tools that allow compressive forces of approximately 20 to 150 kiloNewtons to be achieved. These tools are commonly used for operations to crimp or cut electric cables.

These tools generally comprise a body in which are accommodated a fluid reservoir, a hydraulic pump, a cylinder and a piston capable of being moved inside the cylinder under the effect of an injection of pressurised fluid into the interior of the cylinder. These tools also comprise a tool head fixed to the body and adapted to receive a die set, one of the dies being operated by the piston. The dies are removable and the head can receive different die sets depending on the operation to be performed.

These tools generally comprise a manually operated fluid return valve, enabling the pressure in the cylinder to be reduced and the fluid contained in the cylinder to be returned to the reservoir once the operation is completed. Manual operation of the fluid return valve can sometimes be considered tedious, particularly when the operator has to perform a large number of operations in succession.

In addition, these tools comprise a pressure relief valve so that the pressure of the fluid injected into the cylinder can be prevented from exceeding a predetermined threshold. These pressure relief valves comprise a movable needle closing a fluid escape opening and a spring holding the needle in the opening. The force exerted by the spring on the needle is calibrated so that the needle is moved under the effect of the fluid pressure in the cylinder only when the pressure reaches the predetermined threshold.

SUMMARY OF THE INVENTION

One aim of the invention is to allow the automatic and rapid return of the fluid contained in the cylinder to the reservoir at the end of operation.

This problem is solved within the scope of the present invention via a pressure relief valve for a hydraulic press tool, comprising a valve body, a fluid circulation channel, a needle and a seat, the needle being movable relative to the valve body between a closed position in which the needle is in contact with the seat in order to close the channel and an open position in which the needle is at a distance from the seat in order to allow fluid to circulate in the channel, characterised in that the seat is movable relative to the valve body so that, as soon as fluid circulates in the channel because of the movement of the needle to the open position, the fluid causes a movement of the seat relative to the valve body that tends to move the seat away from the needle and prevents the seat from returning towards the needle, in order to maintain the circulation of fluid in the channel.

The pressure relief valve is thus used to perform a fluid return function.

By virtue of the movable seat, the pressure relief valve remains open as long as fluid is circulating in the channel, which allows complete evacuation of the fluid contained in the cylinder of the tool.

This allows a tool to be designed in which the fluid returns automatically and rapidly to the reservoir as soon as the pressure in the cylinder has reached the predetermined pressure threshold.

The valve may also have the following features:
- the fluid circulation channel comprises an orifice formed in the valve body, the seat being movable between a closed position in which the seat closes the orifice and an open position in which the seat allows fluid to circulate through the orifice;
- the valve comprises a spring arranged so as to urge the needle towards the seat;
- the valve comprises a stop to limit the movement of the needle relative to the valve body towards the seat when the seat is at a distance from the needle;
- the seat is capable of being moved relative to the valve body towards the needle in order to bring the seat back into contact with the needle;
- the valve comprises a stop to limit the movement of the seat towards the needle when the needle moves away from the seat;
- the seat comprises a rod capable of projecting outside the valve body when the seat is at a distance from the needle, the rod being capable of being urged by a piston of the tool in order to push the seat towards the needle;
- the fluid circulation channel leads to an orifice of the rod and the rod has notches allowing fluid to circulate in the channel despite the orifice being closed by the piston when the piston urges the rod.

The invention also relates to a hydraulic press tool comprising:
- a tool body comprising a cylinder;
- a piston capable of being moved inside the cylinder under the effect of an injection of pressurised fluid into the interior of the cylinder;
- a fluid return conduit; and
- a pressure relief valve as specified above, arranged inside the fluid return conduit in order to cause evacuation of the fluid contained in the cylinder when the fluid pressure in the cylinder exceeds a predetermined threshold.

In an embodiment of the invention, the piston is capable of being moved relative to the tool body from a retracted position to an extended position when the fluid pressure in the cylinder rises.

The tool may comprise a return spring arranged in order to urge the piston towards the retracted position.

The seat of the valve may be arranged in such a way that when the piston returns to the retracted position, the piston urges the seat in order to bring the seat back into contact with the needle.

In an embodiment of the invention, the tool comprises a tool head fitted onto the tool body and crimping dies received in the tool head.

BRIEF DESCRIPTION OF THE DRAWINGS

Other features and advantages will become more apparent from the description that follows, which is purely illustrative, and not limiting and should be read with reference to the accompanying drawings, in which.

DETAILED DESCRIPTION OF AN EMBODIMENT

Figure 1:
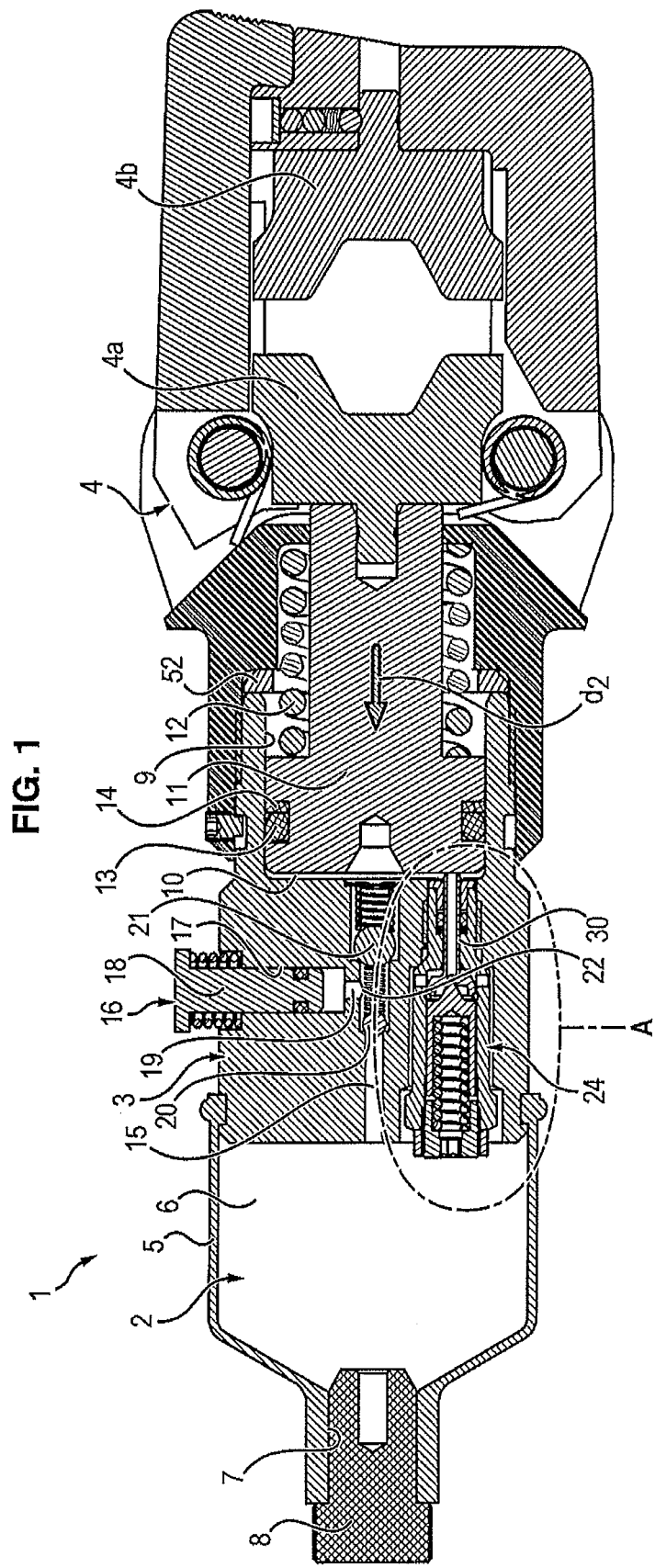
FIGS. 1 and 1a illustrate diagrammatically in longitudinal cross-section, of a hydraulic press tool according to an embodiment of the invention (FIG. 1a being a view of a detail of FIG. 1)
Figure 1A:
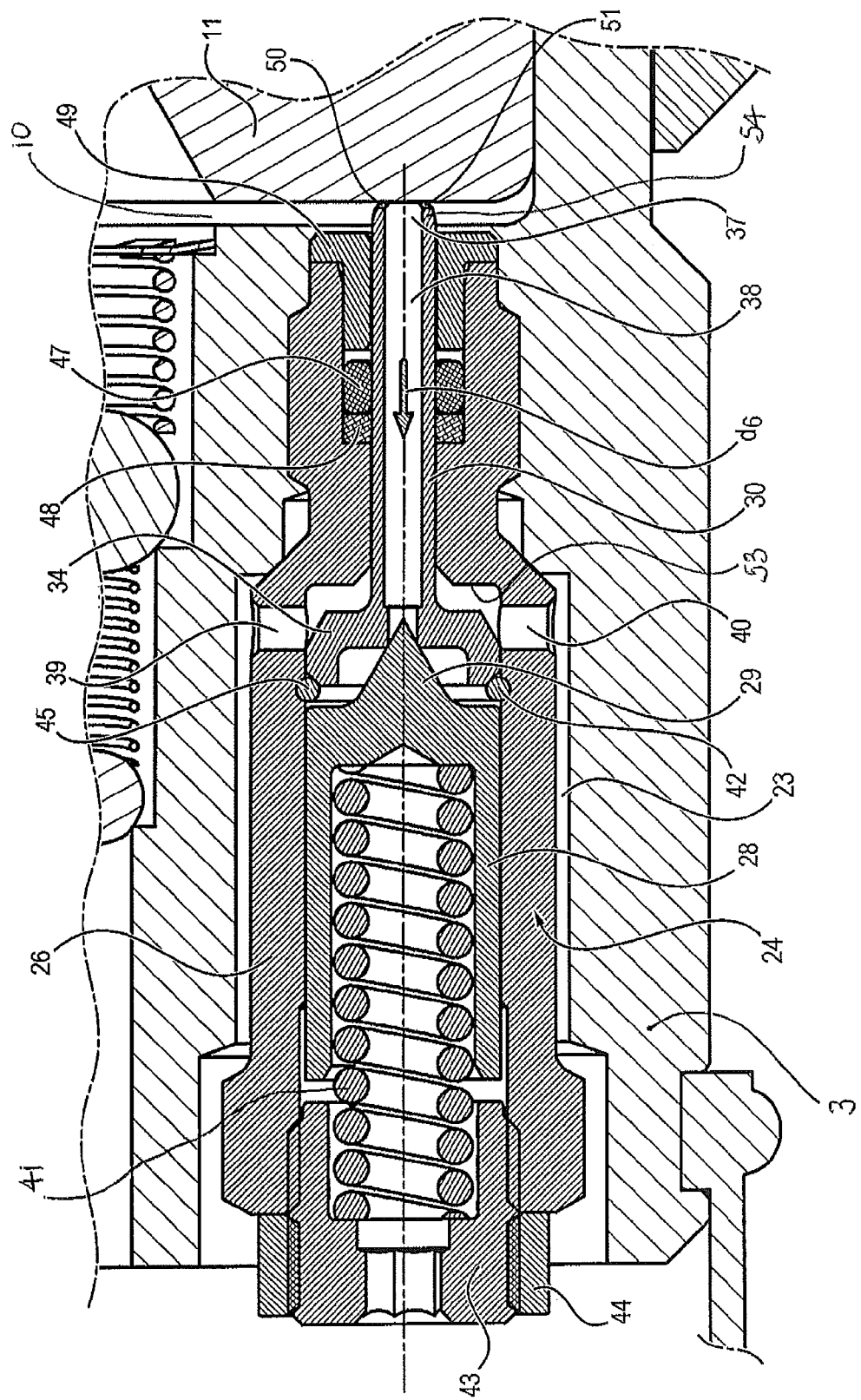

In FIGS. 1 and 1a, the hydraulic press tool 1 shown comprises a fluid reservoir 2, a tool body 3 and a tool head 4.

The reservoir 2 comprises a flexible wall 5 surrounding a cavity 6 intended to contain fluid, an opening 7 allowing the reservoir to be filled and a stopper 8 to close the opening. The fluid is typically oil.

The tool head 4 is fitted onto the tool body 3 and is adapted to receive a die set, such as a pair of crimping dies 4a and 4b.

Figure 6:
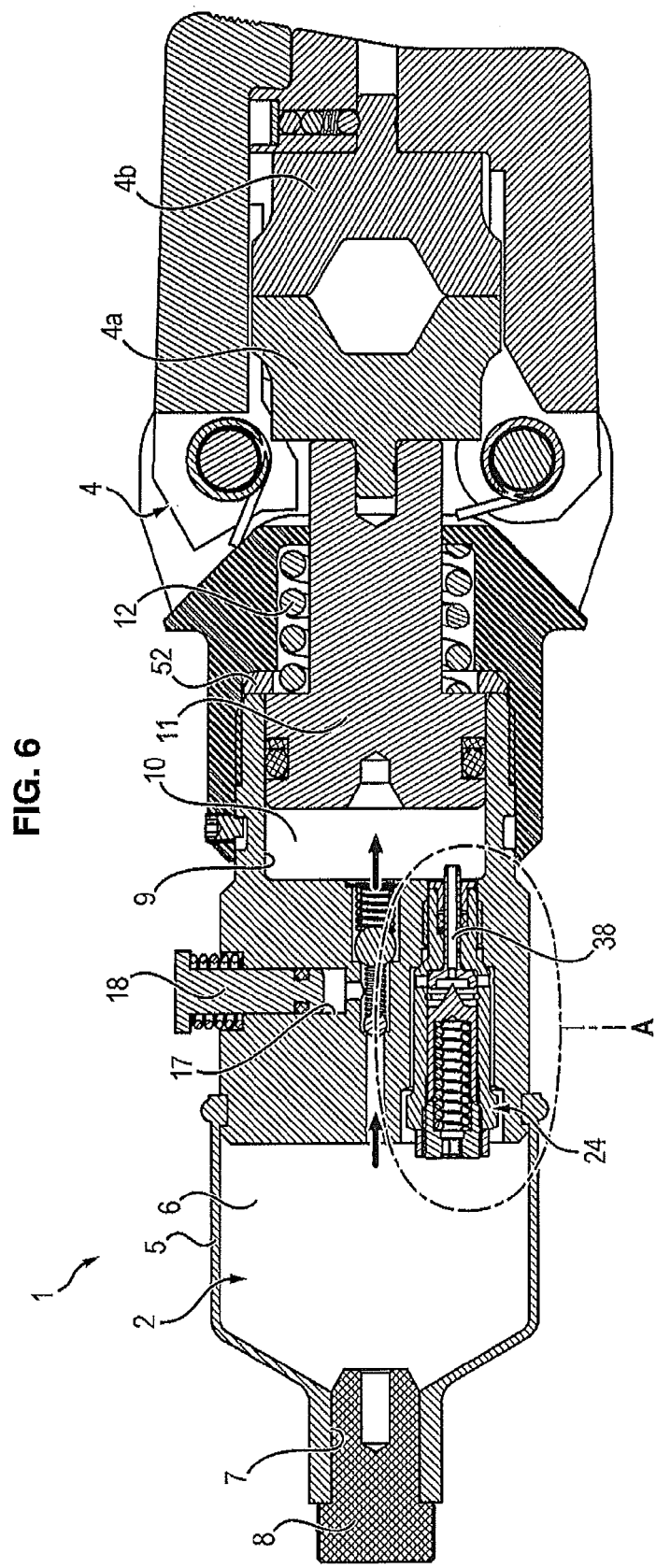
Figure 6A:
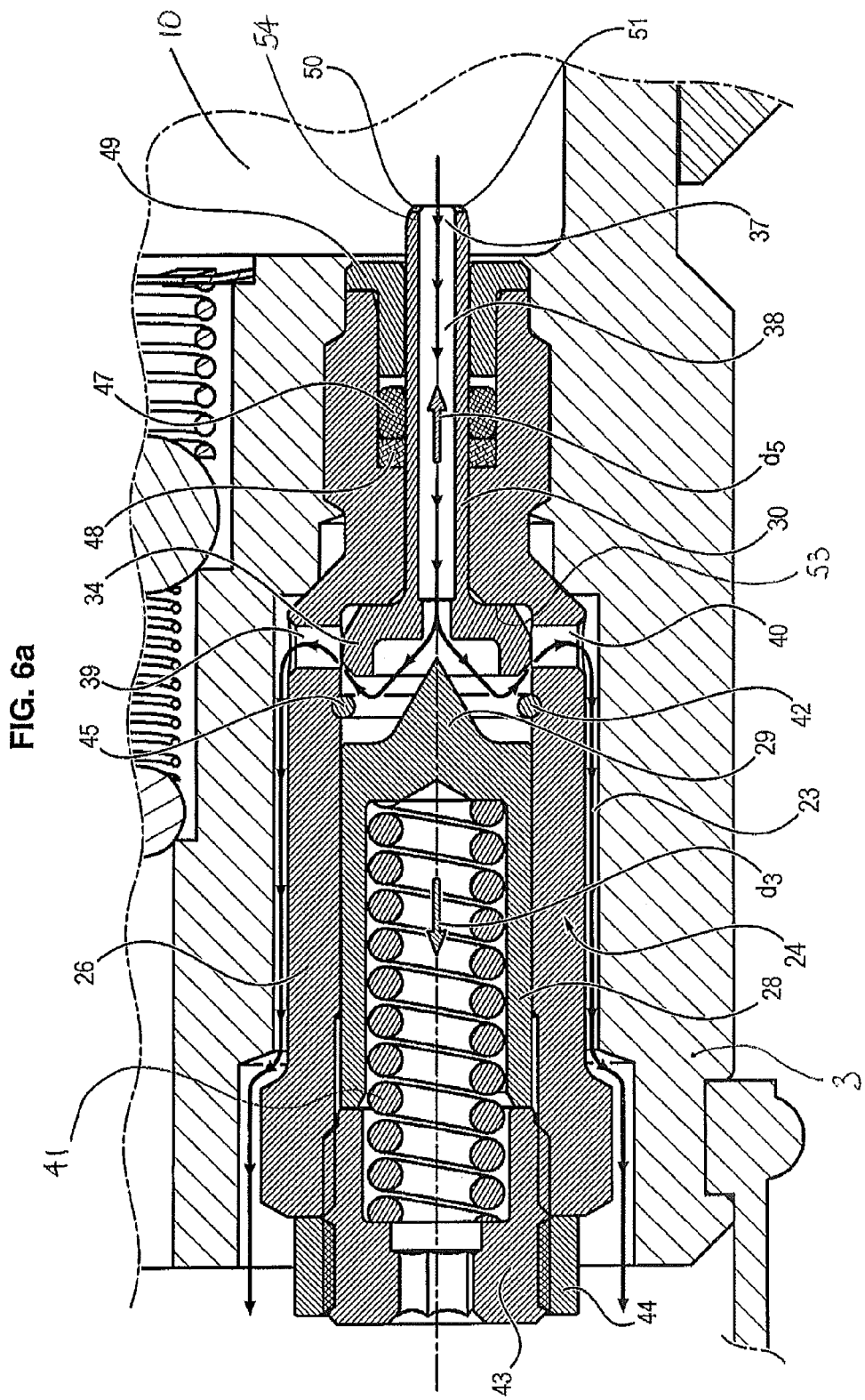
Figure 7:
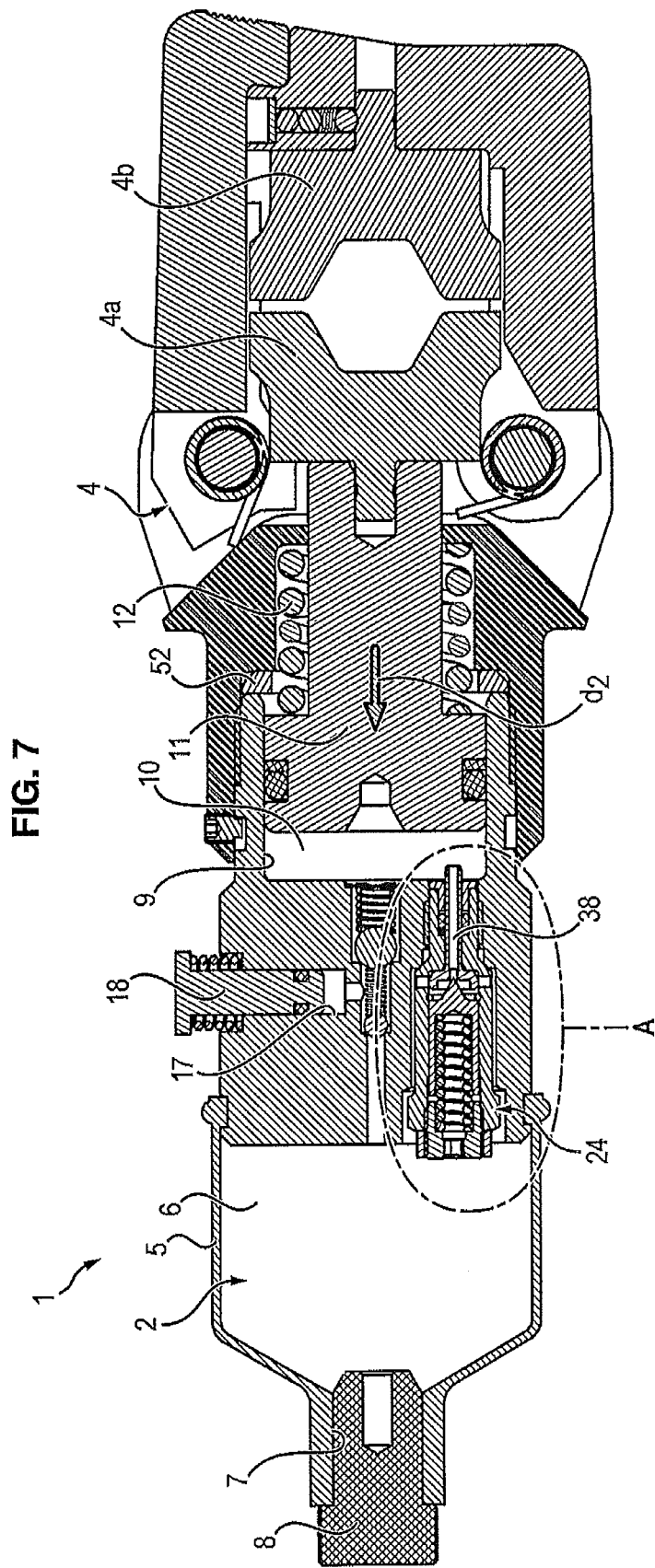
Figure 7A:
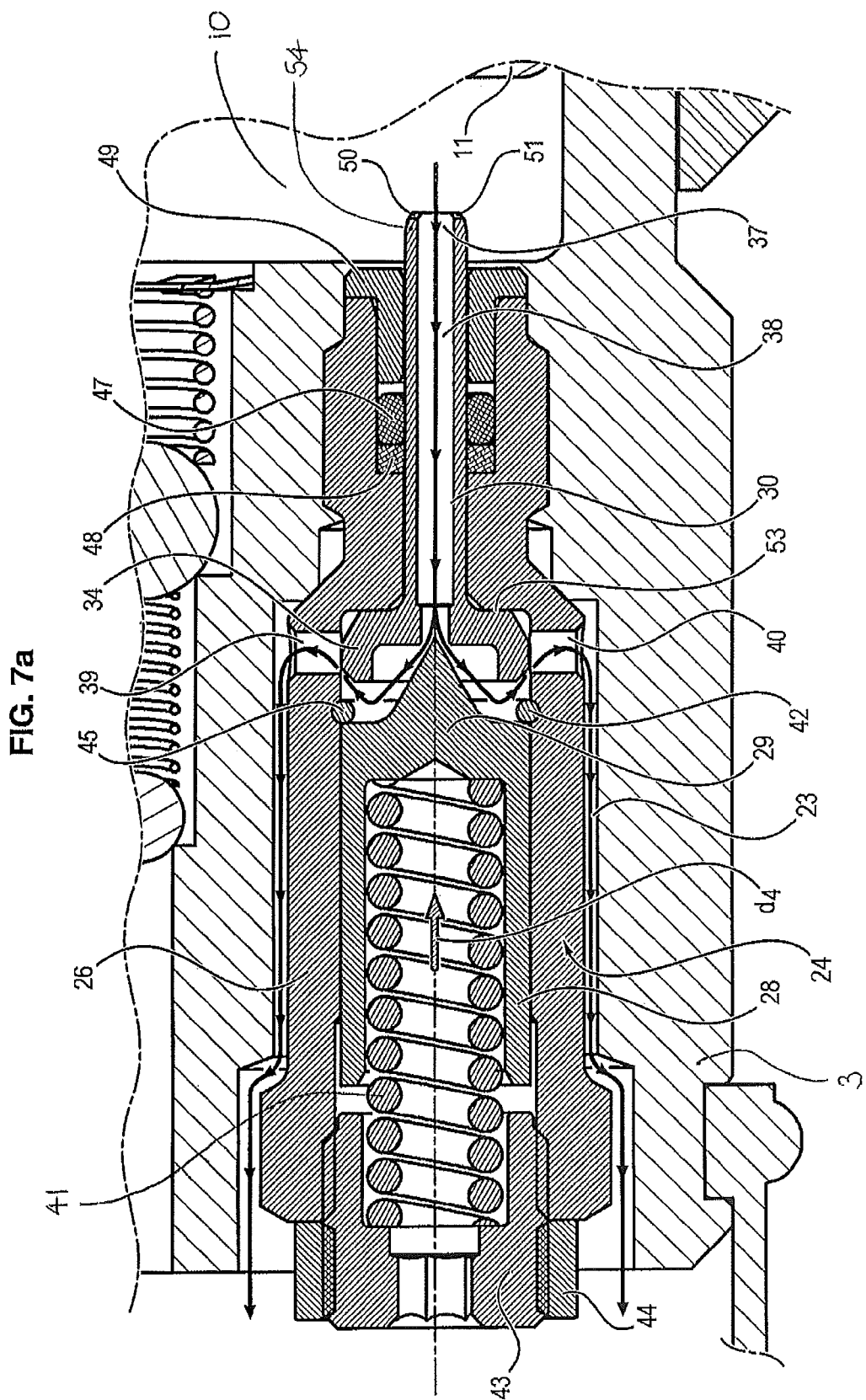

The tool body 3 comprises a cylinder 9 with a cavity 10. The tool 1 comprises a piston 11 fitted movably inside the cavity 10. The piston 11 is adapted to operate one of the dies 4a of the set. The piston 11 is movable relative to the tool body 3 between a retracted position (shown in FIG. 1) and an extended position (shown in FIG. 6) to operate the die. The tool 1 further comprises a helical return spring 12 urging the piston 11 towards the retracted position. The piston 11 also comprises a seal 13 and an anti-extrusion ring 14 providing sealing between the cylinder 9 and the piston 11.

The tool body 3 may also comprise a stop 52 adapted to limit the movement of the piston 11 in the extended position. However, in a crimping tool, this stop 52 is not usually present. It is therefore the dies 4a and 4b that, in coming into contact with one another, limit the movement of the piston 11.

The tool body 3 comprises a fluid injection conduit 15 extending between the reservoir 2 and the cavity 10 of the cylinder 9, and a hydraulic pump 16 to inject fluid from the reservoir 2 towards the cavity 10 via the conduit 15. The hydraulic pump 16 comprises a pump cylinder 17 and a pump piston 18 capable of being driven in a backward and forward movement in the pump cylinder 17. The tool body 3 further comprises a lateral conduit 19 extending between the pump cylinder 17 and the injection conduit 15. The hydraulic pump 16 also comprises two ball check valves 20 and 21 arranged in the injection conduit 15 either side of an orifice 22 via which the lateral conduit 19 leads into the injection conduit 15. The first check valve 20 allows fluid from the reservoir 2 to penetrate into the conduit 15 when the piston 18 moves in a first direction (the direction of fluid aspiration) in the cylinder 17 and it prevents a return of aspirated fluid from the cylinder 17 to the reservoir 2 when the piston 18 moves in a second direction (the direction of fluid discharge), opposed to the first direction. The second check valve 21 prevents fluid in the cavity 10 from returning to the conduit 15 when the piston 18 moves in the first direction and allows fluid discharged by the piston 18 to be injected into the cavity 10 when the piston 18 moves in the second direction.

The tool body 3 also comprises a fluid return conduit 23 extending between the cavity 6 of the reservoir 2 and the cavity 10 of the cylinder 9 to allow fluid contained in the cylinder 9 to return to the reservoir 2.

The tool 1 comprises a pressure relief valve 24 arranged in the fluid return conduit 23, the pressure relief valve allowing fluid to circulate in the fluid return conduit 23 when the pressure in the cavity 10 has reached a predetermined threshold.

Figure 2:
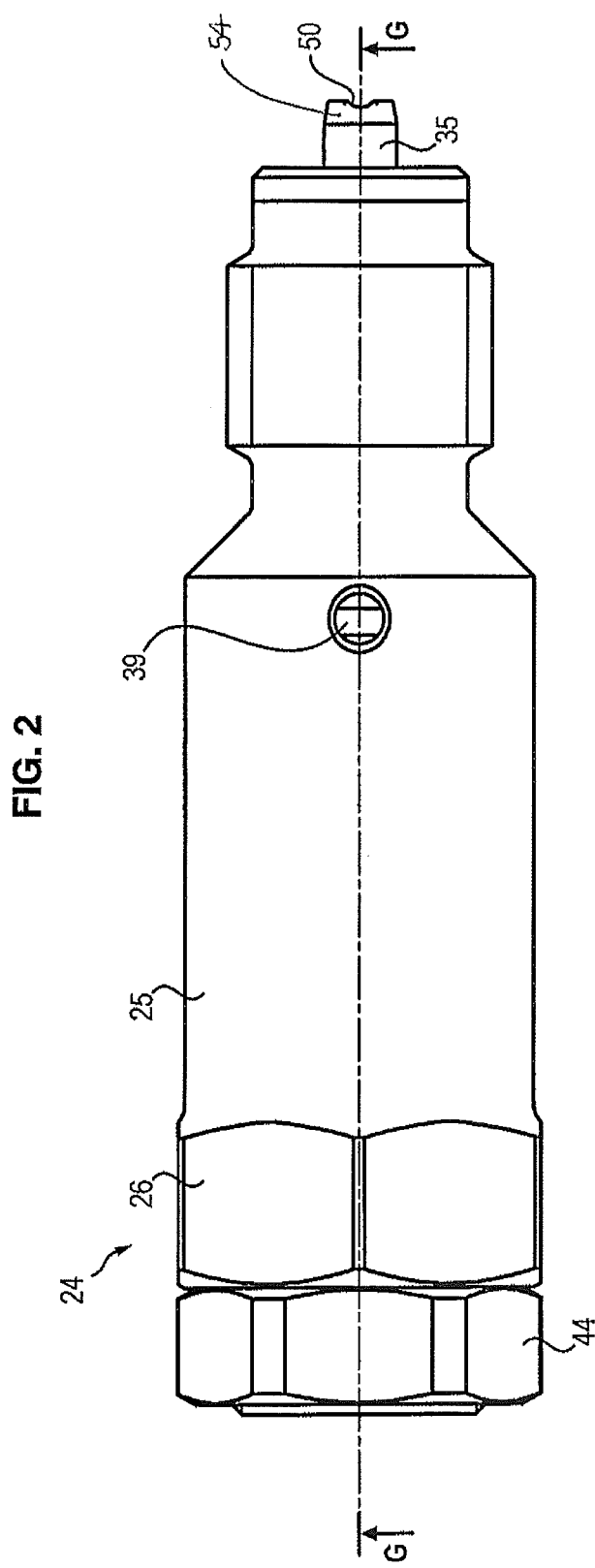
FIGS. 2 and 3 illustrate diagrammatically a cartridge including a pressure relief valve, intended to be incorporated into the hydraulic press tool of FIG. 1, (FIG. 3 being a view in longitudinal cross-section of the valve)
Figure 3:
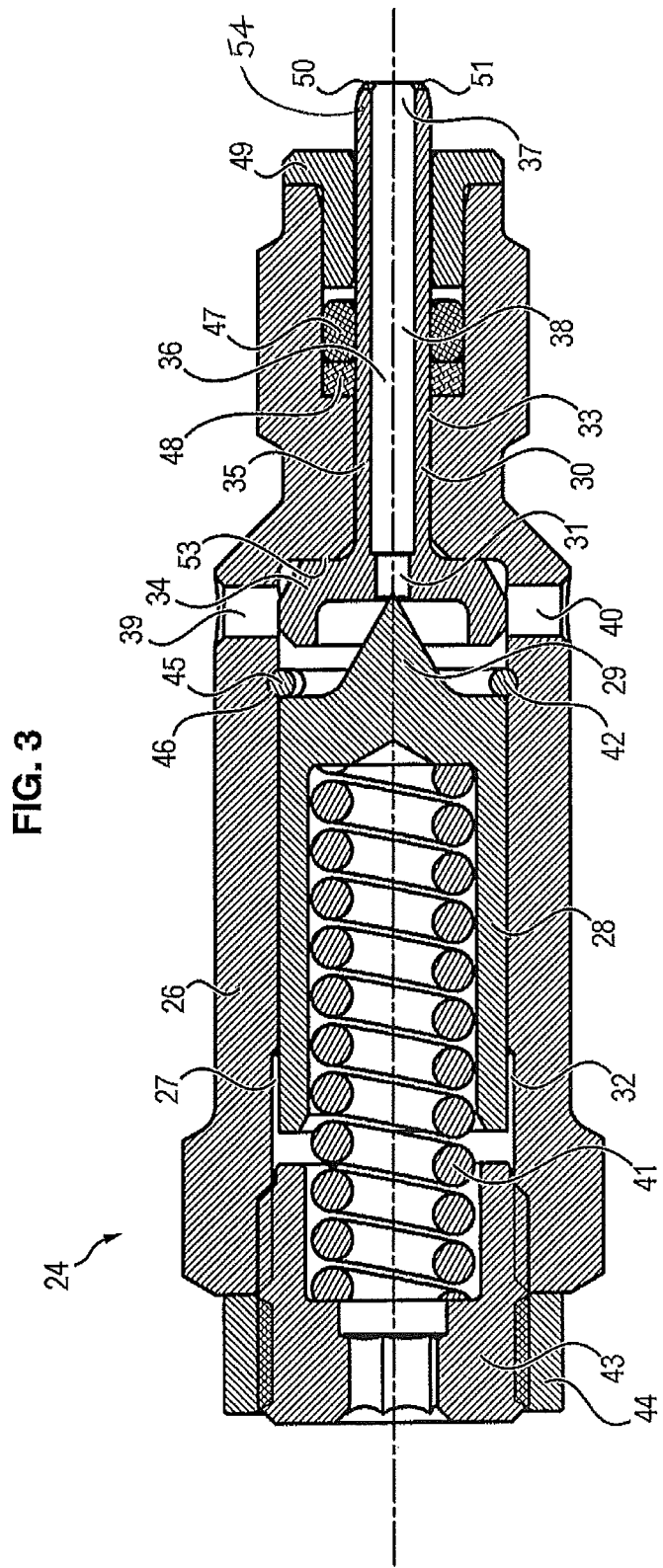
Figure 4:
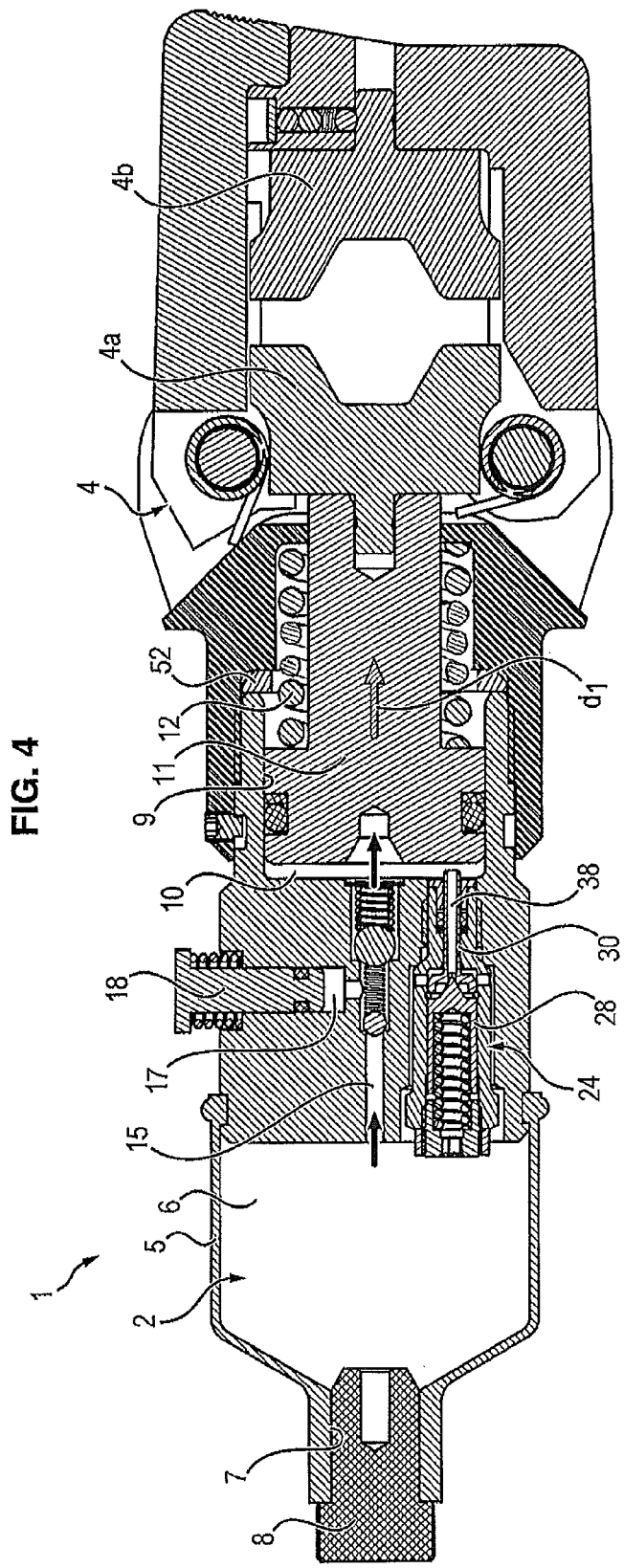
FIGS. 4 to 8 illustrate diagrammatically different stages in the operation of the tool of FIG. 1, (FIGS. 6a, 7a and 8a being views of details of FIGS. 6, 7 and 8 respectively).
Figure 5:
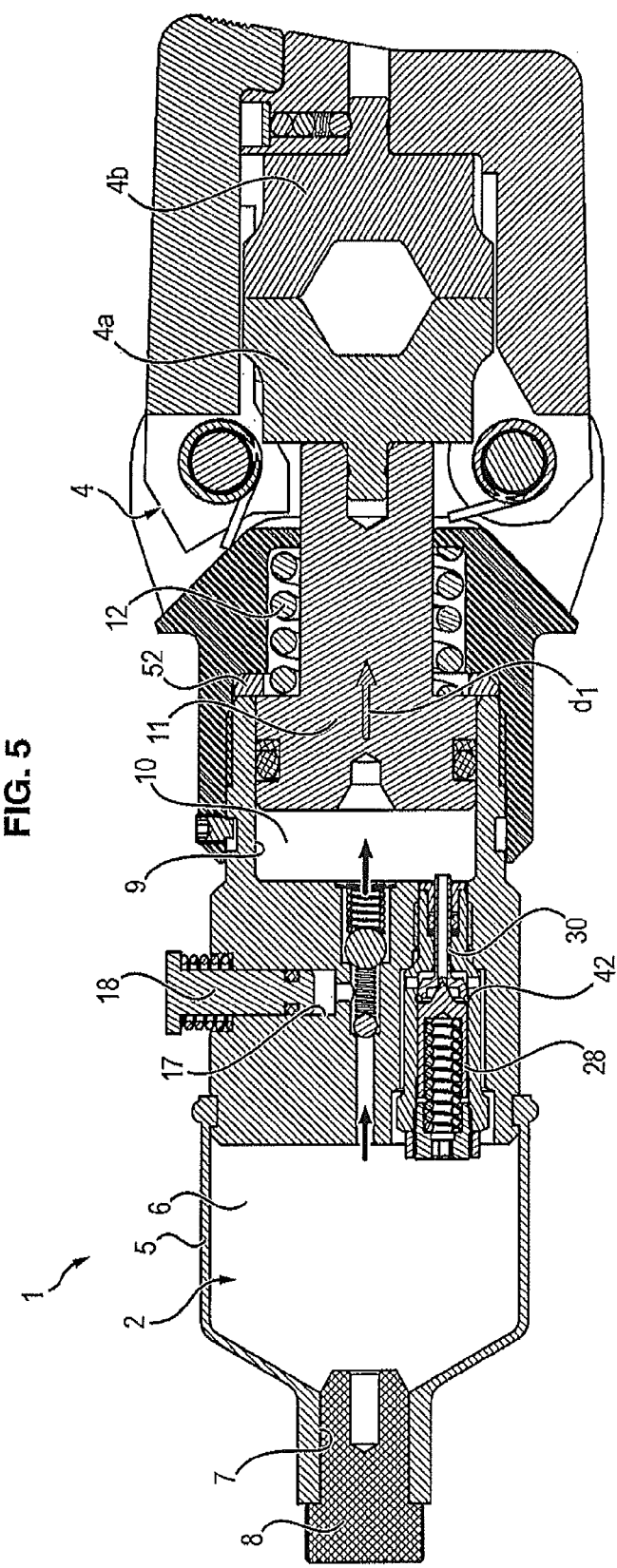

FIGS. 2 and 3 show the pressure relief valve 24 in greater detail.

As can be seen in FIG. 2, the pressure relief valve 24 is made in the form of a cartridge 25 detachable from the tool body 3 and which can be inserted into the fluid return conduit 23 of the tool body 3. The pressure relief valve 24 can thus be regulated independently in order to adjust the pressure threshold at which automatic return of the fluid is triggered.

As illustrated in FIG. 3, the pressure relief valve 24 comprises a valve body 26 with a generally cylindrical shape and defining an internal cavity 27. The pressure relief valve 24 also comprises a needle 28 and a seat 30, both fitted so that they are movable relative to the valve body 26. More specifically, the needle 28 and the seat 30 are fitted sliding inside the internal cavity 27. The needle 28 has a conical portion 29, and the seat 30 has an opening 31 adapted to cooperate with the conical portion 29 in order to open or close the valve 26.

The internal cavity 27 has a first portion 32 of large diameter, which receives the needle 28, and a second portion 33 of small diameter, which receives a portion of the seat 30. The first portion 32 and the second portion 33 are connected via a shoulder 53.

The seat 30 comprises a first portion 34 of large diameter (or head) extending inside the first portion 32 of the inner cavity 27 and a second portion 35 of small diameter (or rod) extending inside the second portion 33 of the inner cavity 27. The seat 30 also comprises a bore 36 passing through the first portion 34 and the second portion 35. The bore 36 leads firstly, via the opening 31, into the portion 34 of large diameter and, secondly, via an opening 37, into the cavity 10 at the portion 35 of small diameter.

The valve body 26 has two lateral orifices 39 and 40 allowing passage of the fluid when the valve 24 is open. More specifically, the seat 30 is movable relative to the valve body 26 between a closed position in which the seat 30 closes the lateral orifices 39 and 40 and prevents passage of the fluid and an open position in which the seat 30 allows the fluid to pass through the lateral orifices 39 and 40. The seat 30 passes from the closed position to the open position by moving away from the needle 28.

Thus a fluid circulation channel 38 is formed by the bore 36 extending through the seat 30 and by the two lateral orifices 39 and 40 formed in the valve body 26.

In addition, the pressure relief valve 24 comprises a compression spring 41 adapted to urge the needle 28 towards the seat 30, and a stop 42 adapted to limit the movement of the needle 28 towards the seat 30.

The stop 42 also limits the movement of the seat 30 towards the needle 28.

The pressure relief valve 24 further comprises a screw 43 and a locknut 44. The screw 43 has a threaded outer surface adapted to cooperate with a threaded inner surface of the first portion 32 of the internal cavity 27. The locknut 44 has an inner threaded surface adapted to cooperate with the outer threaded surface of the screw.

The compression spring 41 extends between the needle 28 and the screw 43. The force exerted by the spring 41 on the needle 28 can be regulated by tightening the screw 43. The regulation of the force exerted by the spring 41 determines the pressure threshold for triggering the opening of the valve 24. Once regulation of the force is complete, the locknut 44 is fitted onto the screw 43 and locked against the body 26 to prevent the screw 43 from being loosened.

The stop 42 comprises a flexible ring 45 received in a groove 46 formed in an internal surface of the cavity 27 of the valve body 26.

The pressure relief valve 24 also comprises an O-ring seal 47 and an anti-extrusion ring 48 arranged between the seat 30 and the valve body 26. The O-ring seal 47 prevents the passage of fluid between the valve body 26 and the seat 30. The pressure relief valve 24 also comprises an end ring 49 to protect the seal 47 and the ring 48, and to guide the seat 30 when the seat moves.

As can be seen in FIGS. 2 and 3, when the seat 30 is moved away from the needle 28, the rod 35 of the seat 30 projects outside the valve body 26. Thus, the rod 35 is capable of being urged by the piston 11 of the tool in order to push the seat 30 back towards the needle 28 when the piston 11 returns to the retracted position.

In addition, the rod 35 comprises notches 50 and 51 allowing fluid to circulate in the channel 38 despite the orifice 37 being closed by the piston 11 when the piston 11 makes contact with the rod 35.

The operation of the hydraulic press tool 1 is shown in FIGS. 1, 1a, 4, 5, 6, 6a, 7, 7a, 8 and 8a.

Initially, the tool 1 is at rest (FIGS. 1 and 1a). The piston 11 is in the retracted position. The piston 11 is held in this position by the return spring 12. The pressure relief valve 24 is in the closed position: the conical portion 29 of the needle 28 is in contact with the seat 30 and closes the opening 31, preventing any circulation of fluid in the fluid circulation channel 38. In addition, the seat 30 closes the lateral orifices 39 and 40.

When the hydraulic pump is operated (FIG. 4), the pump piston 18 moves in a backwards and forwards movement in the pump cylinder 17, the effect of which is that some fluid taken from the reservoir 2 is injected into the cylinder 9 via the fluid injection conduit 15. The injection of fluid under pressure into the cylinder 9 has the effect of moving the piston 11 of the tool towards the extended position (arrow $d_1$), against the return force exerted by the spring 12. The return spring 12 is compressed as the piston 11 moves. The pressure of the fluid contained in the cylinder 9 increases. The needle 28 is still in the closed position and closes the fluid circulation channel 38.

The rise in fluid pressure in the cylinder 9 (FIG. 5) causes the piston 11 to rest against the stop 52 or the dies 4a and 4b to come into mutual abutment. In addition, the rise in fluid pressure in the cylinder 9 also causes the seat 30 to rest against the stop 42.

As soon as the fluid pressure in the cylinder 9 reaches a predetermined pressure threshold (FIGS. 6 and 6a), the fluid causes, in sequence, a movement of the needle 28 relative to the valve body 26 and a movement of the seat 30 relative to the valve body 26.

Because of this, when the fluid pressure in the cylinder 9 reaches the predetermined pressure threshold, the fluid pressure acts on the conical portion 29 of the needle 28. The fluid pressure is then sufficient to move the needle 28 relative to the valve body 26 against the compression spring 41 (arrow $d_3$). Under the effect of the pressure exerted by the fluid, the needle 28 moves away temporarily from the seat 30 and allows some fluid to escape from the cylinder 9 via the fluid circulation channel 38 towards the internal cavity 27 of the valve. The consequence of this is that some pressurised fluid penetrates between the seat 30 and the needle 28.

However, the fluid cannot escape immediately via the lateral orifices 39 and 40.

The sudden introduction of fluid between the seat 30 and the needle 28 causes a movement of the seat 30 relative to the valve body 26 that tends to move the seat 30 away from the needle 28 (arrow $d_5$) due to the force of the pressurized fluid on the exposed surfaces of the seat head 34. The lateral orifices 39 and 40 are cleared and the fluid can escape.

The pressure relief valve 24 opens and fluid contained in the cylinder 9 flows towards the reservoir 2 via the fluid return conduit 23. The effect of this is to bring the pressure in the cylinder 9 back below the predetermined threshold.

As soon as the fluid pressure in the cylinder 9 falls back below the predetermined threshold (FIGS. 7 and 7a), the needle 28 returns to its initial position against the stop 42 under the effect of the force exerted by the compression spring 41 (arrow $d_4$).

However, the seat 30 is held in the open position because of the circulation of the fluid in the fluid circulation channel 38. Because of this, the seat 30 is subject, on the one hand, to the pressure of the fluid present inside the first portion 32 of the internal cavity 27, this pressure operating on the large-diameter portion 34 of the seat 30, and, on the other hand, to the pressure of the fluid present in the cavity 10 of the cylinder 9, this pressure being exerted on the small-diameter portion 35 of the seat 30. Because of the difference in diameter between the portions 34 and 35 of the seat 30, the seat 30 is held at a distance from the needle 28 as long as fluid is circulating in the fluid return conduit 23. The effect of this is that the seat 30 comes into abutment against the shoulder 53 of the valve body 26.

As the needle 28 is held away from the seat 30 by the stop 42, the pressure relief valve 24 remains open as long as fluid is circulating in the channel 38.

The reduction in the fluid pressure in the cylinder 9 causes the piston 11 to return to the retracted position under the action of the return spring 12 (arrow $d_2$).

Figure 8:
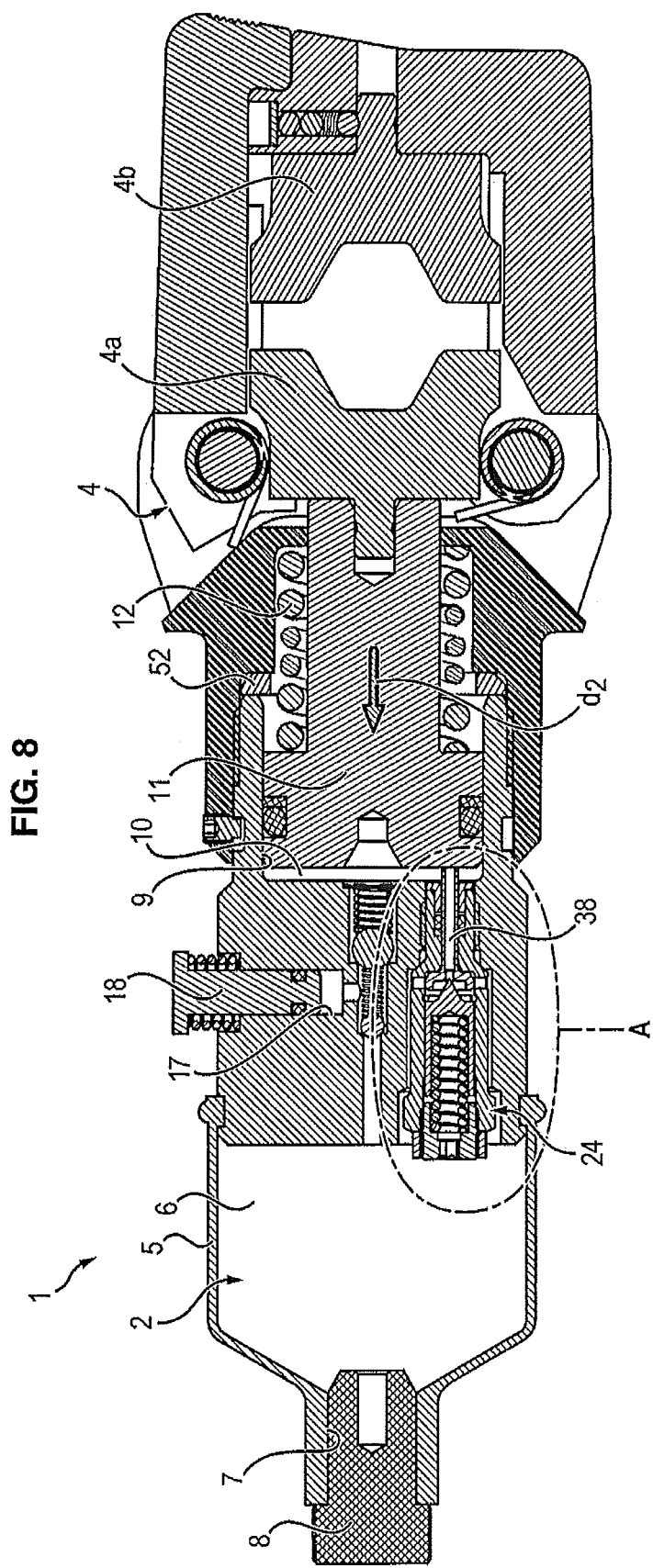
Figure 8A:
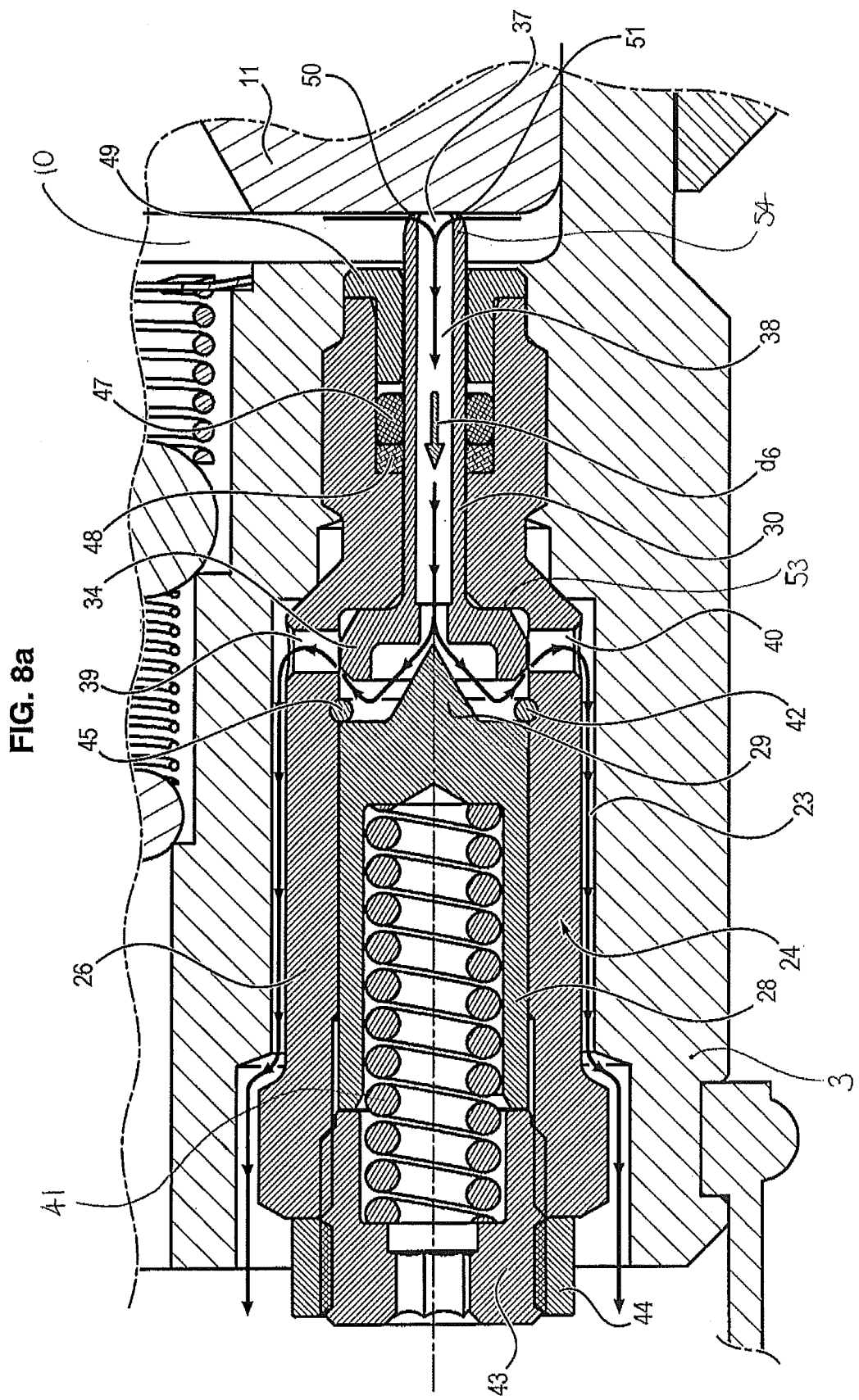

As the fluid returns to the reservoir 2, the piston 11 is brought back towards the retracted position (FIGS. 8 and 8a). The return of the piston 11 towards the retracted position leads to the continuous evacuation of the fluid contained in the cylinder 9 to the reservoir 2 via the fluid return conduit 23. As the pressure relief valve is held open by the circulation of the fluid in the channel 38, the fluid returns automatically and rapidly to the reservoir 2.

When the piston 11 approaches the retracted position, the piston 11 comes into contact with an extension portion 54 of the seat 30 which projects into the cavity 10 of the cylinder 9. In its movement, the piston 11 urges the seat 30 in order to push the seat 30 back towards the needle 28 (arrow $d_6$). Once the piston is in contact with the seat 30, the fluid is evacuated from the cylinder 9 via the notches 50 and 51 made in the extension portion 54, despite the piston 11 being brought into contact with the extension portion 54. This allows the fluid contained in the cylinder 9 to be fully evacuated and the tool 1 to be returned to the rest position (FIGS. 1 and 1a).

The tool 1 which has just been described is particularly suited to the performance of crimping operations, in particular for the connection of electric cables.

What is claimed is:

1. A pressure relief valve for venting hydraulic fluid pressurized above a pre-determined threshold pressure from a cavity over an operating piston to a fluid reservoir of a hydraulically operated tool, the pressure relief valve comprising; a valve body, a fluid flow channel, a needle and a seat, the needle is movable relative to the valve body between a closed position, in which the needle is in contact with the seat and blocks the channel, and an open position, in which the needle is at a distance from the seat, and the seat is movable relative to the valve body so that, when pressurized fluid flows in the channel because of the movement of the needle to the open position, then the pressurized fluid moves the seat relative to the valve body and away from the needle.

2. A pressure relief valve according to claim 1, wherein which the fluid flow channel comprises an orifice formed in the valve body, the seat being movable between a seat closed position in which the seat closes the orifice and a seat open position in which the seat allows fluid to flow through the orifice.

3. A pressure relief valve according to claim 1, and further comprising a spring arranged so as to urge the needle towards the seat.

4. A pressure relief valve according to claim 1, and further comprising a needle stop to limit the movement of the needle within the valve body towards the seat.

5. A pressure relief valve according to claim 1, wherein the seat is movable within the valve body towards the needle in order to bring the seat back into contact with the needle.

6. A pressure relief valve according to claim 5, and further comprising a seat stop to limit movement of the seat towards the needle.

7. A pressure relief valve according to claim 1, wherein the seat comprises a rod projectable outside the valve body, and the rod is movable by the operating piston of the tool to drive the seat towards the needle.

8. A pressure relief valve according to claim 7, wherein the fluid flow channel includes an orifice of the rod and the rod has radially extending notches allowing fluid to flow into the channel when the rod is in abutment with the piston.

9. A hydraulically operated tool comprising:
a tool body comprising an operating cylinder;
a piston movable by pressurised fluid inside the cylinder;
a fluid return conduit; and
a pressure relief valve, arranged inside the fluid return conduit for venting hydraulic fluid pressurized above a pre-determined threshold pressure from the operating cylinder, and the pressure relief valve comprising; a valve body, a fluid flow channel, a needle and a seat, the needle movable relative to the valve body between a closed position, in which the needle is in contact with the seat and blocks the channel, and an open position, in which the needle is at a distance from the seat, and the seat is movable relative to the valve body so that, when pressurized fluid flows in the channel because of the movement of the needle to the open position, then the pressurized fluid moves the seat relative to the valve body and away from the needle.

10. A hydraulically operated tool according to claim 9, wherein the piston is movable relative to the tool body from a retracted position to an extended position.

11. A hydraulically operated tool according to claim 10, and further comprising a return spring arranged to urge the piston towards the retracted position.

12. A hydraulically operated tool according to claim 11, wherein when the piston returns to the retracted position, the piston urges the seat back into contact with the needle.

13. A hydraulically operated tool according to claim 9, and further comprising a tool head fitted onto the tool body and crimping dies received in the tool head.

14. A hydraulically operated tool comprising:
a reservoir holding a fluid;
a tool body defining an operating cylinder;
a piston movable by the fluid inside the cylinder between a retracted position and an extended position;
a tool head movable by the piston from a first position to a second position;
a hydraulic pump operable to move the fluid from the reservoir to the cylinder and to raise the pressure of the fluid in the cylinder;
a fluid return conduit for venting the pressurized fluid inside the cylinder back to the reservoir, and the fluid return conduit includes;
a pressure relief valve, located in the tool body for venting the fluid when pressurized above a pre-determined threshold pressure, and the pressure relief valve includes:
a valve body defining an axial bore with a first end proximate to the cylinder and a second end opposite to the first end;
a seat located in the axial bore proximate to the first end, the seat including a seat head defining a first diameter and seat rod defining a second diameter smaller than the first diameter, and the seat is axially movable within the bore from a closed position, wherein the seat obstructs fluid flow through the fluid return conduit, to an open position, wherein pressurized fluid can flow freely through the fluid return conduit; and
a needle located in the axial bore proximate to the second end, and axially movable within the bore from a needle closed position, wherein the needle engages the seat to obstruct pressurized fluid from acting on the seat head, to a needle open position, wherein pressurized fluid flows to atop the seat head and moves the seat relative to the valve body and away from the needle.

15. A hydraulically operated tool according to claim 14, wherein:
the seat includes an axial through bore, and the axial through bore forms a portion of the fluid return conduit, the through bore including a first opening proximate to the cylinder and a second opening proximate to the needle;
the needle includes a conical portion; and
when the seat is in the closed position and the needle is in the needle closed position, then the conical portion of the needle contacts the seat and blocks the second opening so that pressurized fluid cannot flow to atop the seat head.

16. A hydraulically operated tool according to claim 15, wherein pressure relief valve further includes a spring which urges the needle in a first axial direction toward the needle closed position, and a compression force of the spring when the needle is in the closed position is adjustable to set the predetermined threshold pressure at which the needle will move from the needle closed position toward the needle open position.

17. A hydraulically operated tool according to claim 16, wherein:
when the fluid pressure in the cylinder exceeds the predetermined threshold pressure, then the fluid acts through the axial bore onto the conical portion of the needle to move the needle axially away from the seat and towards the needle open position; and
then the pressurized fluid flows through the axial through bore to atop the seat head and moves the seat axially away from the needle and towards the open position, and thereby completes the opening of the fluid return conduit.

18. A hydraulically operated tool according to claim 17, and further comprising a return spring that urges the piston toward the retracted position.

19. A hydraulically operated tool according to claim 18, wherein the seat rod includes an extension portion and, when the seat is in the open position, then the extension portion projects into the cylinder.

20. A hydraulically operated tool according to claim 19, wherein when the seat is in the open position and the piston is moving toward the retracted position, then the piston will push on the rod extension portion and thereby move the seat axially toward the needle and toward the closed position.

* * * * *